(12) United States Patent
Suzuki et al.

(10) Patent No.: US 10,921,598 B2
(45) Date of Patent: Feb. 16, 2021

(54) IMAGE PROJECTION DEVICE

(71) Applicant: QD LASER, INC., Kawasaki (JP)

(72) Inventors: Makoto Suzuki, Kawasaki (JP); Megumi Yamamoto, Kawasaki (JP)

(73) Assignee: QD LASER, INC., Kawasaki (JP)

( * ) Notice: Subject to any disclaimer, the term of this patent is extended or adjusted under 35 U.S.C. 154(b) by 0 days.

(21) Appl. No.: 16/619,053

(22) PCT Filed: Mar. 14, 2018

(86) PCT No.: PCT/JP2018/009941
§ 371 (c)(1),
(2) Date: Dec. 3, 2019

(87) PCT Pub. No.: WO2018/225322
PCT Pub. Date: Dec. 13, 2018

(65) Prior Publication Data
US 2020/0209629 A1   Jul. 2, 2020

(30) Foreign Application Priority Data

Jun. 6, 2017 (JP) ................................. 2017-111967

(51) Int. Cl.
*H04N 9/31* (2006.01)
*G02B 27/01* (2006.01)
(Continued)

(52) U.S. Cl.
CPC ..... *G02B 27/0172* (2013.01); *G02B 17/0663* (2013.01); *H04N 9/3173* (2013.01);
(Continued)

(58) Field of Classification Search
CPC .... H04N 9/31; H04N 9/3173; G02B 27/0172; G02B 17/0663; G02B 26/101; G02B 2027/0112; G02B 2027/0178
(Continued)

(56) References Cited

U.S. PATENT DOCUMENTS 9,406,166 B2 * 8/2016 Futterer ............. G02B 27/0172
9,703,182 B2 * 7/2017 Kurashige ............ H04N 9/3164
(Continued)

FOREIGN PATENT DOCUMENTS

| JP | 2003-315726 A | 11/2003 |
|----|---------------|---------|
| JP | 2008-46253 A  | 2/2008  |
| JP | 2009-258686 A | 11/2009 |
| JP | 2009-294606 A | 12/2009 |
| WO | 2004/029693 A1 | 4/2004 |
| WO | 2017/056802 A1 | 4/2017 |

OTHER PUBLICATIONS

Extended European Search Report for European Patent Application No. 18812788.0 dated May 26, 2020 (9 sheets).
(Continued)

*Primary Examiner* — Trang U Tran
(74) *Attorney, Agent, or Firm* — Kratz, Quintos & Hanson, LLP

(57) ABSTRACT

In the first embodiment and the second embodiment, the case where an image is projected on the retina 52 of one of the eyes 50 has been described, but an image may be projected on the retinas 52 of both eyes 50. In addition, the scan mirror 14 has been described as an example of a scan unit, but the scan unit may be any element as long as it can scan a light beam. For example, other components such as potassium tantalate niobate (KTN) crystal that is an electro-optic material may be used as the scan unit. The case where the light beam is a laser beam has been described as an example, but the light beam may be light other than the laser beam.

12 Claims, 6 Drawing Sheets

(51) Int. Cl.
*G02B 17/06* (2006.01)
*G02B 26/10* (2006.01)

(52) U.S. Cl.
CPC .... *G02B 26/101* (2013.01); *G02B 2027/0112* (2013.01); *G02B 2027/0178* (2013.01)

(58) Field of Classification Search
USPC .................. 348/744; 359/15, 707, 316, 229
See application file for complete search history.

(56) References Cited

U.S. PATENT DOCUMENTS

| | | |
|---|---|---|
| 2006/0072215 A1 | 4/2006 | Nishi |
| 2008/0212195 A1 | 8/2008 | Yamamoto |
| 2009/0316115 A1 | 12/2009 | Itoh |
| 2018/0067325 A1* | 3/2018 | Yonekubo .......... G02B 27/0172 |

OTHER PUBLICATIONS

Written Opinion of the International Searching Authority for International Application No. PCT/JP2018/009941 dated Jun. 5, 2018 (5 sheets).
International Preliminary Report on Patentability for International Application No. PCT/JP2018/009941 dated Dec. 19, 2019 (2 sheets).
International Search Report for International Application No. PCT/JP2018/009941 dated Jun. 5, 2018.
Written Opinion of the International Searching Authority for International Application No. PCT/JP2018/009941 dated Jun. 5, 2018 (4 sheets).
Office Action of corresponding Japanese Patent Application No. 2017-111967 dated Aug. 13, 2019 (3 sheets, 5 sheets translation, 8 sheets total).

* cited by examiner

IMAGE PROJECTION DEVICE

TECHNICAL FIELD

The present invention relates to an image projection device.

BACKGROUND ART

There have been known image projection devices, such as head-mounted displays (HMDs), that directly project an image on the retina of the user by using a light beam emitted from a light source. In such image projection devices, the method referred to as Maxwellian view is employed. In Maxwellian view, a scanning light for forming an image is converged near the pupil to project the image on the retina. The image projection devices disclosed in, for example, Patent Document 1 and Patent Document 2 are known as the image projection device that directly projects an image on the retina.

PRIOR ART DOCUMENTS

Patent Document

Patent Document 1: Japanese Patent Application Publication No. 2009-258686
Patent Document 2: Japanese Patent Application Publication No. 2008-46253

SUMMARY OF THE INVENTION

Problem to be Solved by the Invention

There has been known an image projection device having a structure in which the scanning light for forming an image enters a reflection mirror located in front of the face of the user from the side of the face of the user and is then reflected toward the retina of the user by the reflection mirror. However, such image projection devices still have room for improvement in projecting a good-quality image on the retina of the user.

The present invention has been made in view of above problems, and aims to provide a good-quality image to a user.

Means for Solving the Problem

The present invention is an image projection device including: a light source that emits a light beam; a control unit that generates an image light beam based on input image data, and controls emission of the image light beam from the light source; a scan unit that scans the image light beam emitted from the light source to emit a scanning light; and a projection unit that irradiates a retina of an eye of a user with the scanning light to project an image on the retina, wherein the projection unit includes a first optical system and a second optical system, the first optical system converging the scanning light emitted from the scan unit on a first virtual plane, which is located outside the eye of the user, at an angle substantially equal to a scan angle of the scan unit, the second optical system converging the scanning light that has passed through the first virtual plane on a second virtual plane, which is located inside the eye of the user and near a pupil, at an angle substantially equal to an emission angle from the first virtual plane.

In the above structure, a configuration where in the scanning light, a conjugate relationship of substantially equal magnification between the scan unit and the first virtual plane is achieved through the first optical system, and a conjugate relationship of substantially equal magnification between the first virtual plane and the second virtual plane is achieved through the second optical system may be employed.

In the above structure, a configuration where the first optical system includes a first curved reflection mirror, and a second curved reflection mirror that is located in a latter stage of the first curved reflection mirror and reflects the scanning light to the first virtual plane, the second optical system includes a third curved reflection mirror, and a fourth curved reflection mirror that is located in a latter stage of the third curved reflection mirror and reflects the scanning light to the second virtual plane, and all bent angles at which the image light beam corresponding to a center of the image of the scanning light is reflected by the first curved reflection mirror, the second curved reflection mirror, the third curved reflection mirror, and the fourth curved reflection mirror are substantially equal may be employed.

In the above structure, a configuration where the first curved reflection mirror and the fourth curved reflection mirror are arranged in positions point-symmetric with respect to a point on the first virtual plane, and the second curved reflection mirror and the third curved reflection mirror are arranged in positions point-symmetric with respect to the point on the first virtual plane may be employed.

In the above structure, a configuration where at least one of the first optical system and the second optical system includes a flat reflection mirror may be employed.

In the above structure, a configuration where the first curved reflection mirror and the fourth curved reflection mirror are identical components, and the second curved reflection mirror and the third curved reflection mirror are identical components may be employed.

In the above structure, a configuration where the image light beam when entering the first optical system from the scan unit is substantially collimated light, and the image light beam when entering the second virtual plane from the second optical system is substantially collimated light may be employed.

The present invention is an image projection device including: a light source that emits a light beam; a control unit that generates an image light beam based on input image data, and controls emission of the image light beam from the light source; a scan unit that scans the image light beam emitted from the light source to emit a scanning light; and a projection unit that irradiates a retina of an eye of a user with the scanning light to project an image on the retina, wherein the projection unit includes a first optical system and a second optical system, the first optical system converging the scanning light emitted from the scan unit on a first virtual plane that is located outside the eye of the user, the second optical system converging the scanning light that has passed through the first virtual plane on a second virtual plane that is located inside the eye of the user and near a pupil, each of the first optical system and the second optical system includes a plurality of curved reflection mirrors, and bent angles at which the scanning light is reflected by the plurality of curved reflection mirrors are substantially equal.

In the above structure, a configuration where the first optical system includes, as the plurality of curved reflection mirrors, a first curved reflection mirror and a second curved reflection mirror that is located in a latter stage of the first curved reflection mirror and reflects the scanning light to the first virtual plane, the second optical system includes, as the plurality of curved reflection mirrors, a third curved reflection mirror and a fourth curved reflection mirror that is located in a latter stage of the third curved reflection mirror and reflects the scanning light to the second virtual plane, and the first curved reflection mirror and the fourth curved reflection mirror are arranged in positions point-symmetric with respect to a point on the first virtual plane, and the second curved reflection mirror and the third curved reflection mirror are arranged in positions point-symmetric with respect to the point on the first virtual plane may be employed.

In the above structure, a configuration where the first curved reflection mirror and the fourth curved reflection mirror are identical components, and the second curved reflection mirror and the third curved reflection mirror are identical components may be employed.

In the above structure, a configuration where the first optical system converges the scanning light emitted from the scan unit on the first virtual plane at an angle substantially equal to a scan angle of the scan unit, and the second optical system converges the scanning light that has passed through the first virtual plane on the second virtual plane at an angle substantially equal to an emission angle from the first virtual plane may be employed.

In the above structure, a configuration where in the scanning light, a conjugate relationship of substantially equal magnification between the scan unit and the first virtual plane is achieved through the first optical system, and a conjugate relationship of substantially equal magnification between the first virtual plane and the second virtual plane is achieved through the second optical system may be employed.

In the above structure, a configuration where at least one of the first optical system and the second optical system includes a flat reflection mirror may be employed.

In the above structure, a configuration where the image light beam when entering the first optical system from the scan unit is substantially collimated light, and the image light beam when entering the second virtual plane from the second optical system is substantially collimated light may be employed.

Effects of the Invention

The present invention can provide a good-quality image to a user.

EMBODIMENTS FOR CARRYING OUT THE INVENTION

Hereinafter, with reference to the drawings, embodiments of the present invention will be described.

First Embodiment

Figure 1:
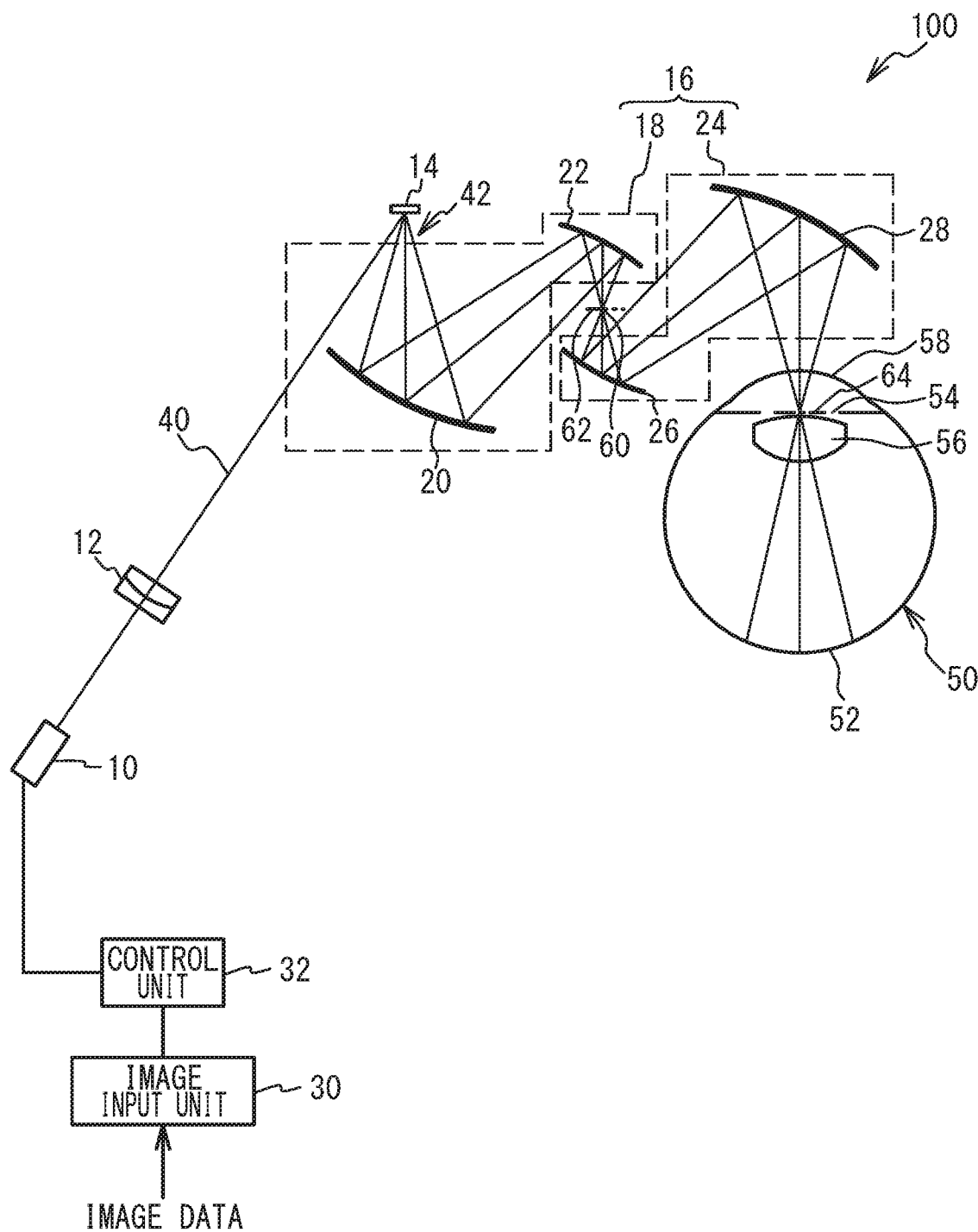
FIG. 1 illustrates an image projection device in accordance with a first embodiment as viewed from above.
Figure 2A:
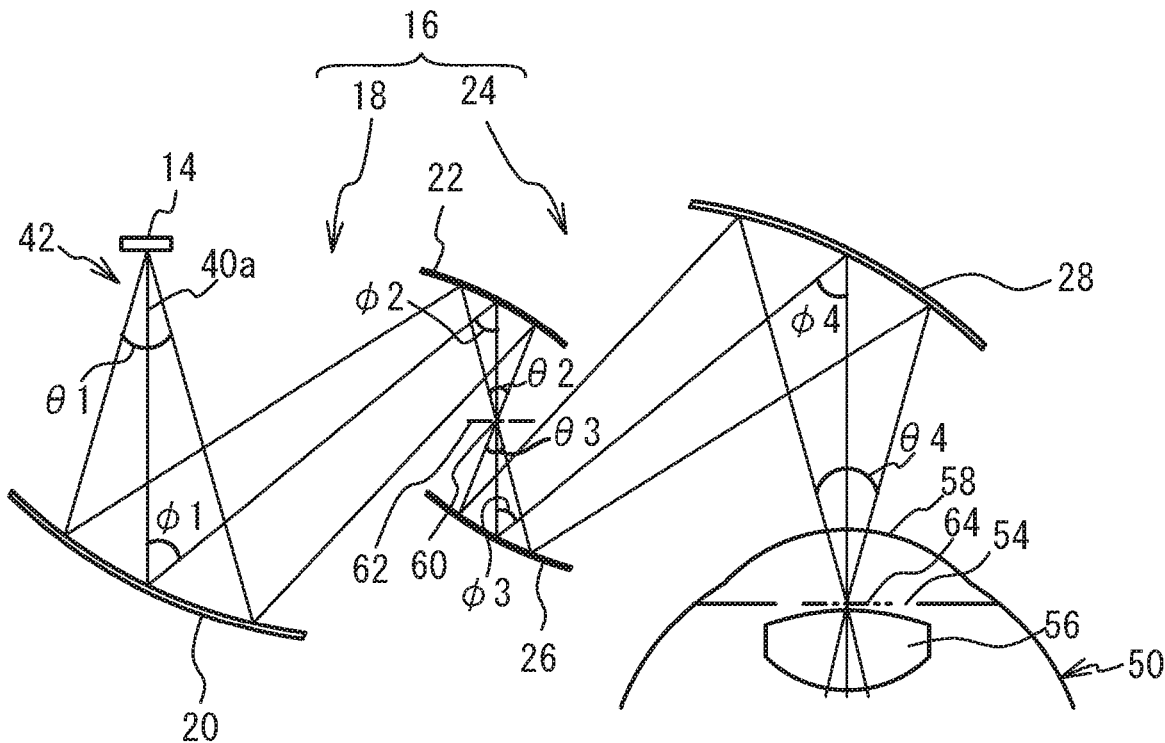
FIG. 2A and FIG. 2B are enlarged views of a projection unit in FIG. 1.
Figure 2B:
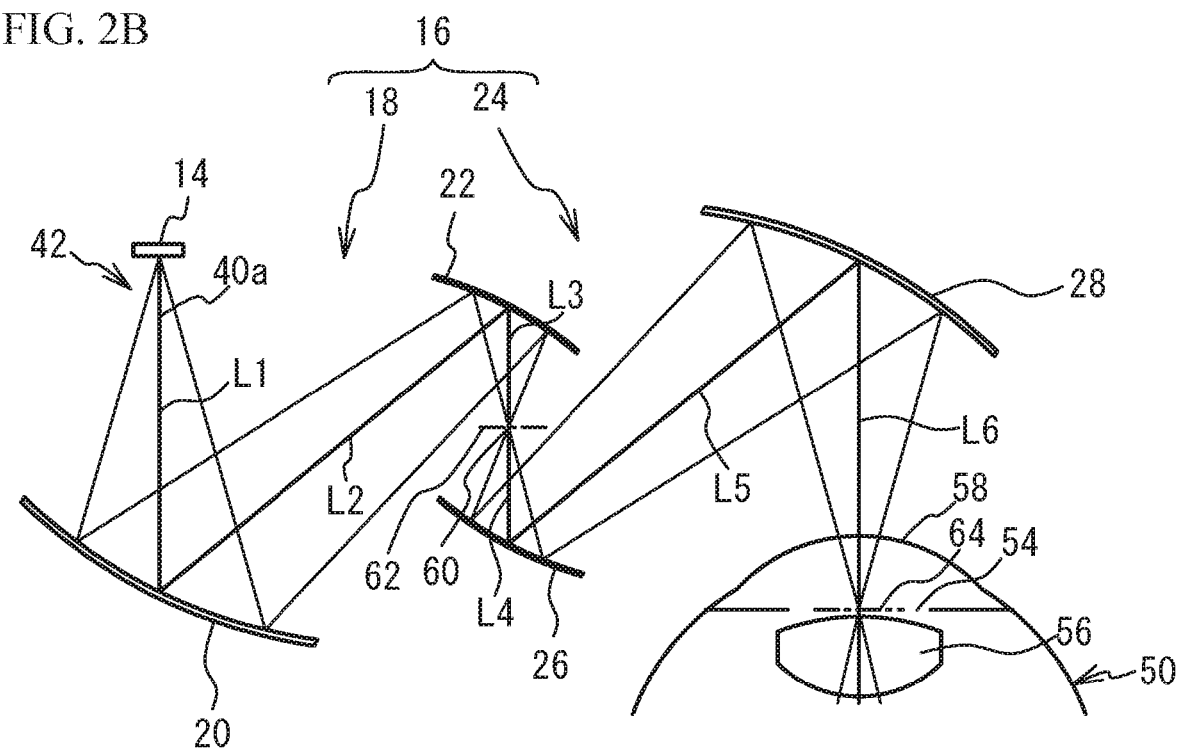

FIG. 1 illustrates an image projection device 100 in accordance with a first embodiment as viewed from above. FIG. 2A and FIG. 2B are enlarged views of a projection unit 16 in FIG. 1. As illustrated in FIG. 1, the image projection device 100 of the first embodiment includes a light source 10, a collimate lens 12, a scan mirror 14, a projection unit 16, an image input unit 30, and a control unit 32. The image projection device 100 of the first embodiment is, for example, a spectacle type. The light source 10 and the collimate lens 12 are arranged in a temple of the glasses. The scan mirror 14 and the projection unit 16 are arranged in a lens of the glasses. The image input unit 30 and the control unit 32 may be provided to an external device (for example, a mobile terminal) instead of glasses, or may be provided to the temple of the glasses.

Image data is input to the image input unit 30 from a camera and/or a video recording device, which are not illustrated. The control unit 32 controls emission of a laser beam 40 from the light source 10 based on the input image data. The light source 10 emits the laser beam 40 of, for example, single wavelength or multiple wavelengths under the control of the control unit 32. Examples of the light source 10 include a light source in which laser diode chips of red, green, and blue (RGB) and a three-color synthesizing device are integrated. As described above, the image data is converted, by the light source 10, into the laser beam 40 that is an image light beam.

The control unit 32 is a processor such as, but not limited to, a central processing unit (CPU). When a camera is installed in a proper position in the image projection device 100 such that the camera faces in the direction in which the eye 50 of the user gazes, the image in the direction of the gaze captured by the camera can be projected on a retina 52. In addition, so called augmented reality (AR) images can be projected by projecting an image input from a video recording device, or superimposing a camera image and an image from the video recording device by the control unit 32.

The collimate lens 12 converts the laser beam 40 emitted from the light source 10 into substantially collimated light. The substantially collimated light is not limited to completely collimated light, and includes, for example, light slightly converging or slightly diverging.

The scan mirror 14 scans the laser beam 40 that has passed through the collimate lens 12 in a two-dimensional direction to emit the scanning light 42. The scan mirror 14 is, for example, a micro electro mechanical system (MEMS) mirror, and two-dimensionally scans the laser beam 40 in the horizontal direction and the vertical direction. The scanning light 42 emitted from the scan mirror 14 enters the projection unit 16.

The projection unit 16 projects an image on the retina 52 by irradiating the retina 52 of an eye 50 of the user with the scanning light 42 emitted from the scan mirror 14. The user recognizes the image by the afterimage effect of the scanning light 42 emitted to the retina 52.

As illustrated in FIG. 1 through FIG. 2B, the projection unit 16 is an optical system including an optical system 18 and an optical system 24. The optical system 18 includes a curved reflection mirror 20 and a curved reflection mirror 22. The reflection surfaces of the curved reflection mirror 20 and the curved reflection mirror 22 are curved surfaces such as free curved surfaces. The curved reflection mirror 20 and the curved reflection mirror 22 are, for example, reflection mirrors having the same focal length (the same curvature radius). The size of the curved reflection mirror 20 is larger than that of the curved reflection mirror 22.

The optical system 24 includes a curved reflection mirror 26 and a curved reflection mirror 28. The reflection surfaces of the curved reflection mirror 26 and the curved reflection mirror 28 are curved surfaces such as free curved surfaces. The curved reflection mirror 26 and the curved reflection mirror 28 are, for example, reflection mirrors having the same focal length (the same curvature radius). The size of the curved reflection mirror 28 is larger than that of the curved reflection mirror 26. The focal lengths of the curved reflection mirror 20 and the curved reflection mirror 22 and the focal lengths of the curved reflection mirror 26 and the curved reflection mirror 28 are not necessarily completely the same, and may be substantially the same to the extent that the quality of the image projected on the retina 52 by irradiating the retina 52 with the scanning light 42 is not affected.

The curved reflection mirror 20 and the curved reflection mirror 28 have, for example, the same shape and are identical components. The curved reflection mirror 22 and the curved reflection mirror 26 have, for example, the same shape and are identical components. Thus, the curved reflection mirror 20, the curved reflection mirror 22, the curved reflection mirror 26, and the curved reflection mirror 28 have, for example, the same focal length (the same curvature radius).

The curved reflection mirror 20 and the curved reflection mirror 28 are arranged in positions point-symmetric with respect to a point 60. The curved reflection mirror 22 and the curved reflection mirror 26 are arranged in positions point-symmetric with respect to the point 60.

When the plane that is located outside the eye 50 of the user and passes through the point 60 is defined as a virtual plane 62, the scanning light 42 emitted from the scan mirror 14 is reflected by the curved reflection mirror 20 and the curved reflection mirror 22 in this order, and converges on the virtual plane 62. The scan angle θ1 of the scan mirror 14 and the convergence angle θ2 at which the scanning light 42 converges on the virtual plane 62 are the same angle. That is, in the scanning light 42, a conjugate relationship of equal magnification between the scan mirror 14 and the virtual plane 62 is achieved through the optical system 18.

When a plane that is located inside the eye 50 and near the pupil 54 is defined as a virtual plane 64, the scanning light 42 that has passed through the virtual plane 62 is reflected by the curved reflection mirror 26 and the curved reflection mirror 28 in this order, and then converges on the virtual plane 64. The emission angle θ3 at which the scanning light 42 is emitted from the virtual plane 62 (the emission angle θ3=the convergence angle θ2) is the same angle as the convergence angle θ4 at which the scanning light 42 converges on the virtual plane 64. That is, in the scanning light 42, a conjugate relationship of equal magnification between the virtual plane 62 and the virtual plane 64 is achieved through the optical system 24.

The scan angle θ1 and the convergence angle θ2 and the emission angle θ3 and the convergence angle θ4 are not necessarily completely the same, and may be substantially the same to the extent that the quality of the image projected on the retina 52 is not affected. That is, in the scanning light 42, a conjugate relationship of substantially equal magnification between the scan mirror 14 and the virtual plane 62 may be achieved through the optical system 18, and a conjugate relationship of substantially equal magnification between the virtual plane 62 and the virtual plane 64 may be achieved through the optical system 24.

As illustrated in FIG. 2A, the bent angles φ1, φ2, φ3, and φ4 at which a laser beam 40a, which corresponds to the center of the image projected on the retina 52, of the scanning light 42 is bent by the curved reflection mirrors 20, 22, 26, and 28 are all the same. The bent angle is the sum of the incident angle and the reflection angle. In addition, as illustrated in FIG. 2B, in the laser beam 40a, the sum of the optical path length L1 from the scan mirror 14 to the curved reflection mirror 20 and the optical path length L3 from the curved reflection mirror 22 to the virtual plane 62 is equal to the optical path length L2 from the curved reflection mirror 20 to the curved reflection mirror 22. Similarly, the sum of the optical path length L4 from the virtual plane 62 to the curved reflection mirror 26 and the optical path length L6 from the curved reflection mirror 28 to the virtual plane 64 is equal to the optical path length L5 from the curved reflection mirror 26 to the curved reflection mirror 28.

The bent angles φ1, φ2, φ3, and φ4 are not necessarily completely the same, and may be substantially the same to the extent that the quality of the image projected on the retina 52 is not affected. In addition, the sum of the optical path length L1 and the optical path length L3 may be substantially equal to the optical path length L2, and the sum of the optical path length L4 and the optical path length L6 may be substantially equal to the optical path length L5.

Figure 3:
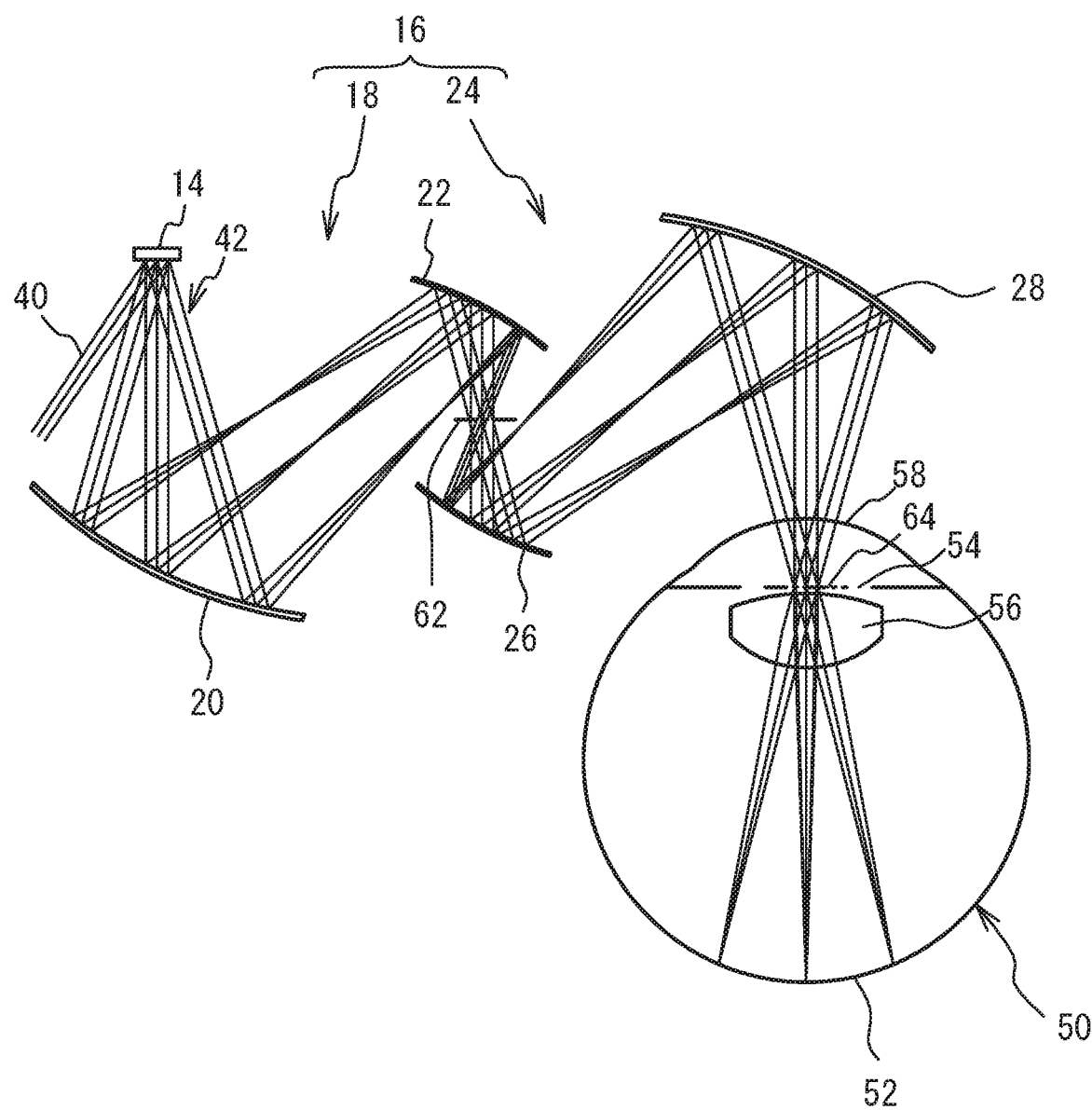
FIG. 3 illustrates a state of a laser beam propagating through the projection unit.

FIG. 3 is a diagram for describing the state of the laser beam 40 propagating through the projection unit 16. As illustrated in FIG. 3, the laser beam 40 forming the scanning light 42 emitted by the scan mirror 14 enters the curved reflection mirror 20 in the state of substantially collimated light. The laser beam 40 is reflected by the curved reflection mirror 20 to become convergent light, is condensed before reaching the curved reflection mirror 22, becomes diverging light, and then enters the curved reflection mirror 22. The laser beam 40 is reflected by the curved reflection mirror 22 to become substantially collimated light, and enters the virtual plane 62.

The laser beam 40 that has passed through the virtual plane 62 enters the curved reflection mirror 26 in the state of substantially collimated light. The laser beam 40 is reflected by the curved reflection mirror 26 to become convergent light, is condensed before reaching the curved reflection mirror 28, becomes a diverging light, and then enters the curved reflection mirror 28. The laser beam 40 is reflected by the curved reflection mirror 28 to become substantially collimated light, and then enters the virtual plane 64. The laser beam 40 is focused near the retina 52 by a crystalline lens 56 of the eye 50 of the user.

Figure 4:
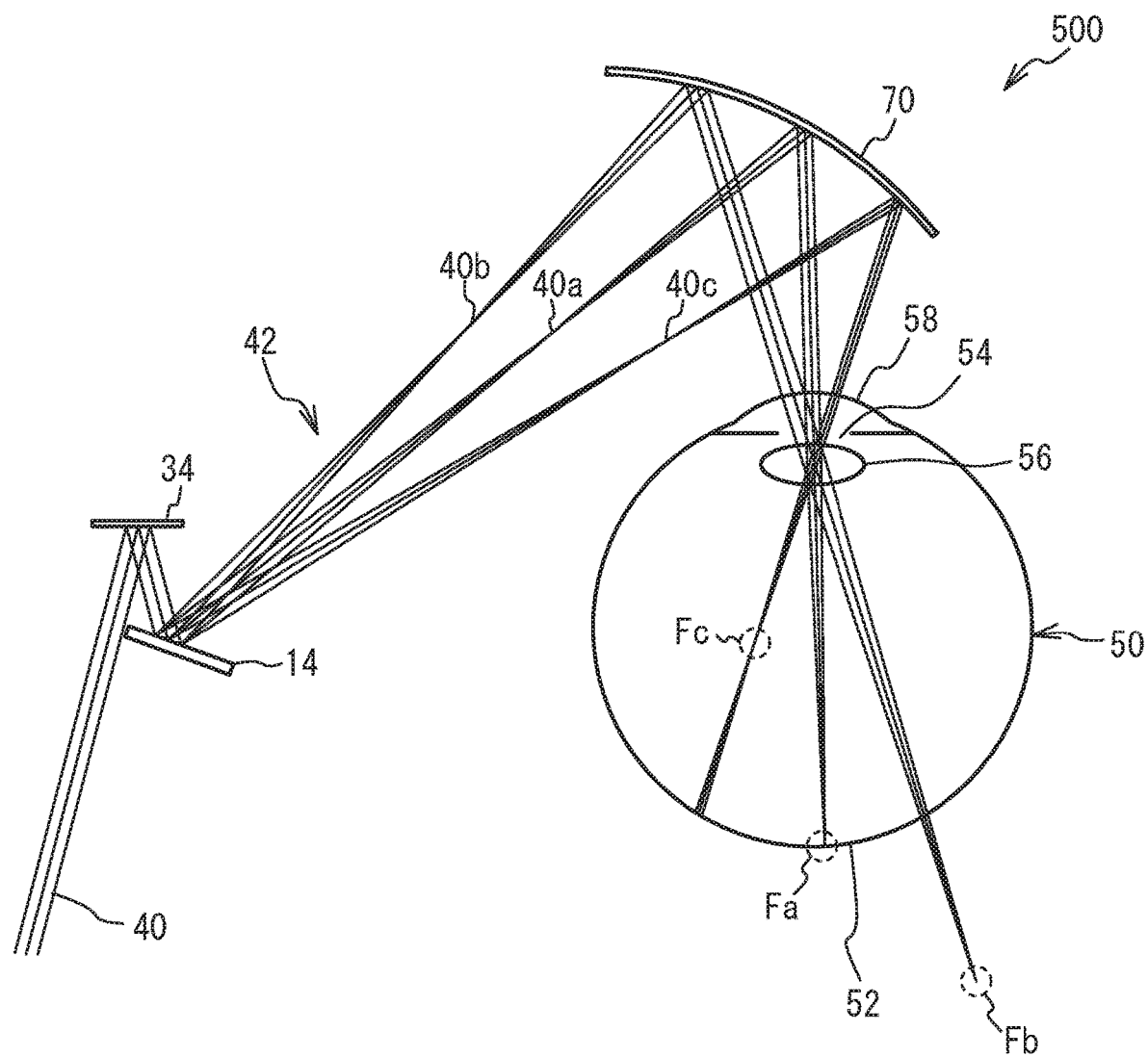
FIG. 4 illustrates an image projection device in accordance with a first comparative example as viewed from above.

FIG. 4 illustrates an image projection device 500 in accordance with a first comparative example as viewed from above. As illustrated in FIG. 4, in the image projection device 500 of the first comparative example, the projection unit is composed of one curved reflection mirror 70 arranged in front of the eye 50 of the user. The laser beam 40 emitted from the light source 10 is reflected by a reflection mirror 34, and then enters the scan mirror 14. The scanning light 42 scanned by the scan mirror 14 is reflected by the curved reflection mirror 70, and is then emitted to the retina 52. Other structures are the same as those of the first embodiment, and the description thereof is thus omitted.

In the structure in which the scanning light 42 scanned by the scan mirror 14 is reflected by one curved reflection mirror 70 to be emitted to the retina 52 as in the first comparative example, the diameter of the laser beam 40 when entering a cornea 58 of the eye 50 becomes less than the diameter of the laser beam 40 when being scanned by the scan mirror 14. When the diameter of the laser beam 40 when entering the cornea 58 decreases, it becomes difficult to project a high-resolution image on the retina 52. This will be described with use of an experiment conducted by the inventor. In the experiment, measured were how well users with different visual acuity: 0.04, 0.5, 0.9, and 1.2 can visually recognize the image projected on the retina 52 when the diameter of the laser beam 40 when entering the cornea 58 was varied. The image projected on the retina 52 was an image having a horizontal viewing angle of 20°, a screen aspect ratio of 16:9, and an effective vertical resolution of 720 lines. For example, when the eye axial length is 24 mm, the size of the image to be projected on the retina 52 is width 5700 μm×height 200 μm.

Figure 5:
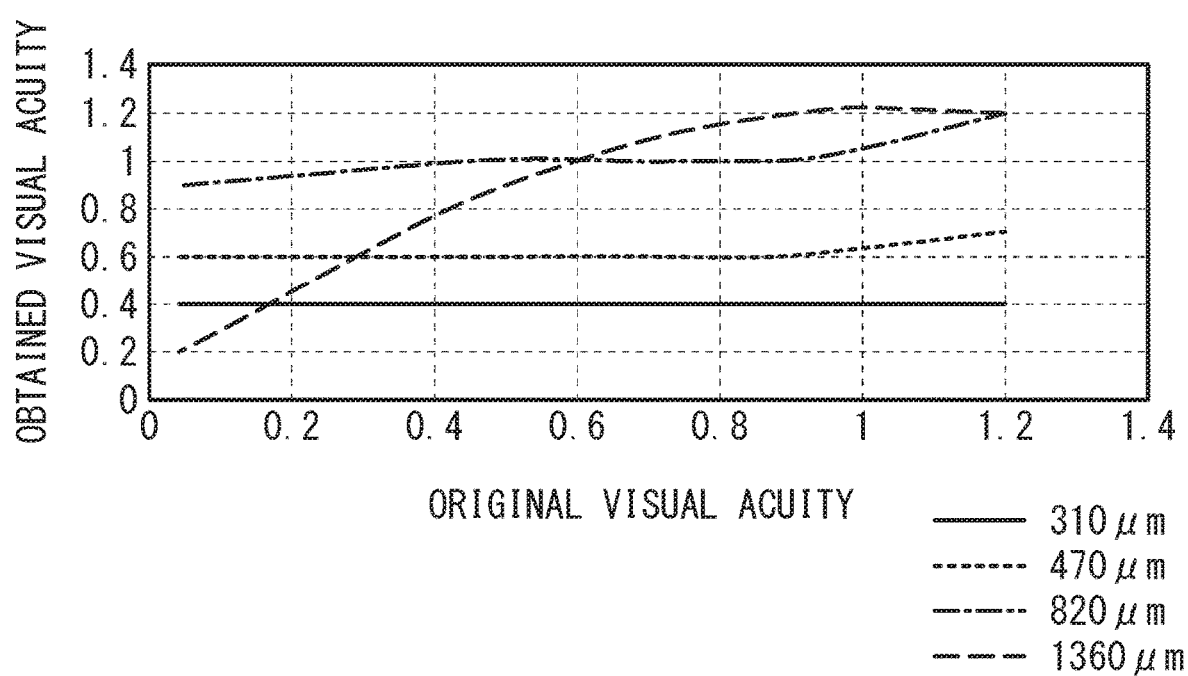
FIG. 5 presents results of an experiment conducted by the inventor.

FIG. 5 illustrates results of the experiment conducted by the inventor. In FIG. 5, the horizontal axis represents an original visual acuity, and the vertical axis represents an obtained visual acuity. The original visual acuity means the above-described visual acuity measured by the general examination for visual acuity. The obtained visual acuity means the visual acuity with respect to the image directly projected on the retina 52 by irradiating the retina 52 with the scanning light. In FIG. 5, the result in the case where the diameter of the laser beam 40 when entering the cornea 58 is 310 μm is indicated by a solid line, the result in the case where the diameter of the laser beam 40 when entering the cornea 58 is 470 μm is indicated by a dotted line, the result in the case where the diameter of the laser beam 40 when entering the cornea 58 is 820 μm is indicated by a chain line, and the result in the case where the diameter of the laser beam 40 when entering the cornea 58 is 1360 μm is indicated by a dashed line. The laser beam 40 enters the cornea 58 in the state of substantially collimated light.

As illustrated in FIG. 5, when the diameter of the laser beam 40 when entering the cornea 58 is large such as 820 μm and 1360 μm, the obtained visual acuity is high. This reveals that when the diameter of the laser beam 40 when entering the cornea 58 is large, a high-resolution image can be projected on the retina 52, but when the diameter of the laser beam 40 when entering the cornea 58 is small, it is difficult to project a high-resolution image on the retina 52.

Thus, in the first embodiment, as illustrated in FIG. 2A, the projection unit 16 includes the optical system 18 that converges the scanning light 42 emitted from the scan mirror 14 on the virtual plane 62 at the convergence angle θ2 that is substantially equal to the scan angle θ1 of the scan mirror 14, and the optical system 24 that converges the scanning light 42 that has passed through the virtual plane 62 on the virtual plane 64 at the convergence angle θ4 that is substantially equal to the emission angle θ3 from the virtual plane 62. That is, in the scanning light 42, a conjugate relationship of substantially equal magnification between the scan mirror 14 and the virtual plane 62 is achieved through the optical system 18, and a conjugate relationship of substantially equal magnification between the virtual plane 62 and the virtual plane 64 is achieved through the optical system 24. Thus, the diameter of the laser beam 40 when entering the cornea 58 can be made to be substantially equal to the diameter of the laser beam 40 when being scanned by the scan mirror 14. Thus, a high-resolution image can be projected on the retina 52, and provision of a good-quality image to the user becomes possible.

In the first comparative example, when a laser beam 40a corresponding to the center of the image enters the crystalline lens 56 in the state of substantially collimated light and focuses near the retina 52 (that is, the focusing position Fa of the laser beam 40a is near the retina 52), the laser beam 40b corresponding to a first end of the image enters, as diffusion light, the crystalline lens 56, and focuses at a position farther than the retina 52. A laser beam 40c corresponding to a second end of the image enters, as convergent light, the crystalline lens 56, and focuses at a position closer than the retina 52. As described above, when the laser beam 40a is focused near the retina 52, the focusing position Fb of the laser beam 40b becomes a position farther from the curved reflection mirror 70 than the retina 52 is, and the focusing position Fc of the laser beam 40c becomes a position closer to the curved reflection mirror 70 than the retina 52 is.

The reason why the focusing position Fa through the focusing position Fc differ as described above is because the curvatures in the regions where the laser beam 40a through the laser beam 40c enter the curved reflection mirror 70 differ and/or the optical path lengths of the laser beam 40a through the laser beam 40c become different. Generation of the laser beam 40 that does not focus near the retina 52 makes it difficult to provide a good-quality image to the user. In addition, in the image projection device 500 of the first comparative example, when the laser beam 40 is emitted from the light source 10 based on data of a rectangular image, the image projected on the retina 52 does not have a rectangular shape, and becomes an image of which the shape is an inclined trapezoid. Thus, also in this respect, it is difficult to provide a good-quality image to the user.

On the other hand, in the first embodiment, as illustrated in FIG. 2A, all the bent angles φ1 through φ4 of the laser beam 40a, which corresponds to the center of the image, of the scanning light 42 by the curved reflection mirrors 20, 22, 26, and 28 are substantially the same. Thus, the curved reflection mirror 20 and the curved reflection mirror 28 are arranged in positions point-symmetric with respect to the point 60, and the curved reflection mirror 22 and the curved reflection mirror 26 are arranged in positions point-symmetric with respect to the point 60. This structure allows the influence of the curvatures of the curved reflection mirrors 20 and 22 of the optical system 18 on the laser beam 40 to be canceled out by the influence of the curvatures of the curved reflection mirrors 26 and 28 of the optical system 24 on the laser beam 40. In addition, the difference in the optical path length of the laser beam 40 generated by the curved reflection mirrors 20 and 22 of the optical system 18 can be canceled out by the difference in the optical path length of the laser beam 40 generated by the curved reflection mirrors 26 and 28 of the optical system 24. Thus, the generation of the laser beam 40 that does not focus near the retina 52 is inhibited, and provision of a good-quality image to the user becomes possible. In addition, when the laser beam 40 is emitted from the light source 10 based on data of a rectangular image, the rectangular image can be projected on the retina 52, and thus, provision of a good-quality image to the user is possible also in this respect.

In the first embodiment, as illustrated in FIG. 1, the curved reflection mirror 28 that reflects the scanning light 42 to the eye 50 of the user is arranged in front of the eye 50. This structure causes the scanning light 42 emitted from the scan mirror 14 to the eye 50 through the optical system 18 and the optical system 24 to be emitted to the eye 50 in the same state as the state where the scan mirror 14 is arranged in front of the eye 50.

In addition, in the first embodiment, the curved reflection mirror 20 of the optical system 18 and the curved reflection mirror 28 of the optical system 24 are identical components, and the curved reflection mirror 22 of the optical system 18 and the curved reflection mirror 26 of the optical system 24 are identical components. Thus, the types of the curved reflection mirror are reduced, and the increase in cost is reduced. To reduce the increase in cost, all the curved reflection mirrors 20, 22, 26, and 28 are preferably identical components. On the other hand, to reduce the increase in cost and enhance the degree of freedom in layout of the curved reflection mirrors 20, 22, 26, and 28, the curved reflection mirrors 20 and 28 are preferably identical components, the curved reflection mirrors 22 and 26 are preferably identical components, and the curved reflection mirrors 20 and 28 are preferably components different from the components of the curved reflection mirrors 22 and 26. For example, as illustrated in FIG. 1, to lay out the curved reflection mirrors such that the curved reflection mirrors do not overlap the optical path of the scanning light 42, the sizes of the curved reflection mirrors 22 and 26 are preferably smaller than those of the curved reflection mirrors 20 and 28.

As illustrated in FIG. 3, the laser beam 40 when entering the optical system 18 from the scan mirror 14 is preferably substantially collimated light. This configuration causes the laser beam 40 when entering the virtual plane 64 from the optical system 24 to be substantially collimated light, and therefore, allows the laser beam 40 to be focused on the retina 52 by the crystalline lens 56.

Second Embodiment

Figure 6:
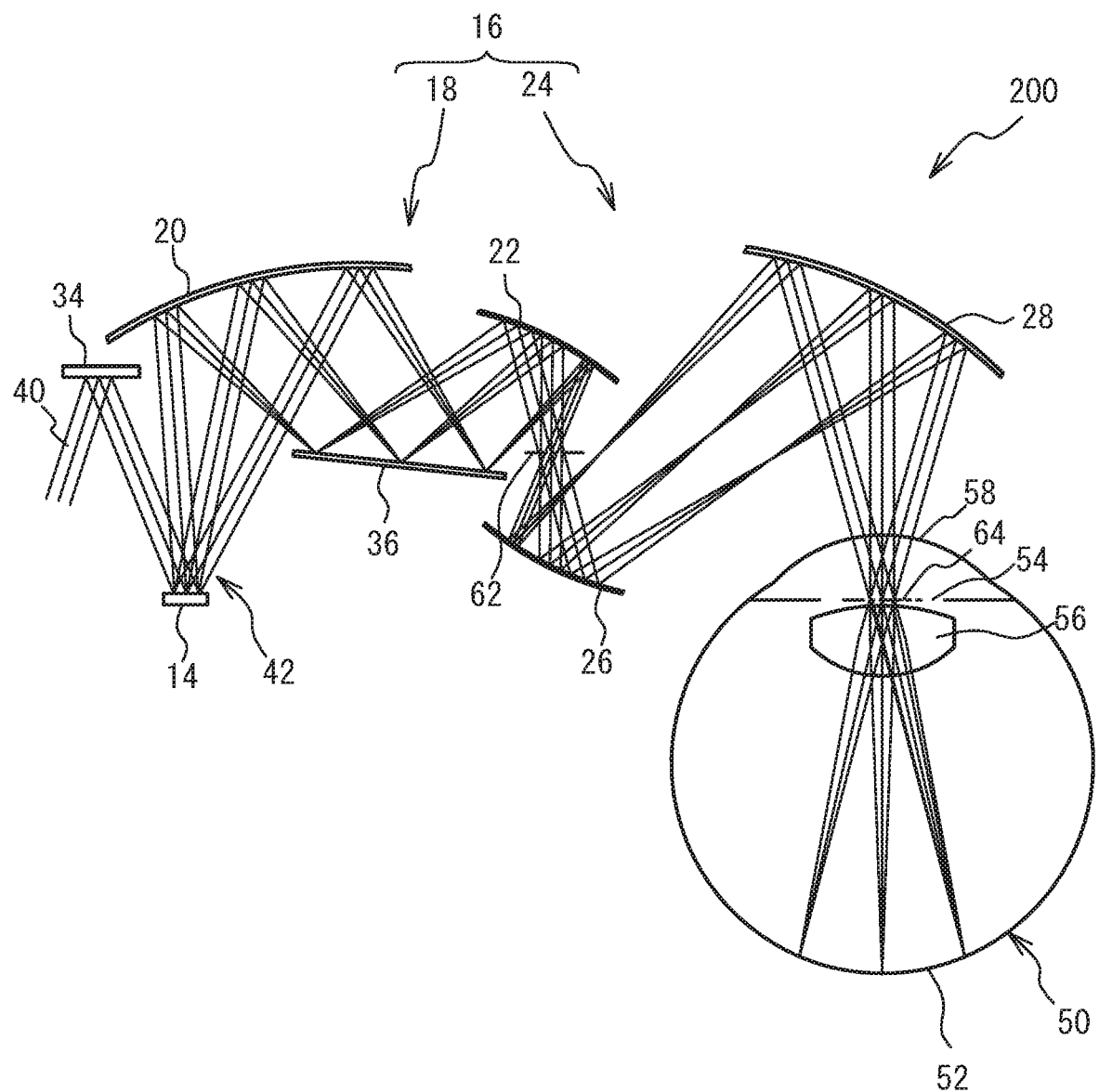
FIG. 6 illustrates an image projection device in accordance with a second embodiment as viewed from above.

FIG. 6 illustrates an image projection device 200 in accordance with a second embodiment. As illustrated in FIG. 6, in the image projection device 200 of the second embodiment, the optical system 18 includes a flat reflection mirror 36 having a flat reflection surface. The flat reflection mirror 36 is arranged on the optical path between the curved reflection mirror 20 and the curved reflection mirror 22. Thus, the scanning light 42 emitted from the scan mirror 14 is reflected by the curved reflection mirror 20, and then reflected by the flat reflection mirror 36 to enter the curved reflection mirror 22. The flat reflection mirror 36 may be arranged in other locations. Other structures are the same as those of the first embodiment, and the description thereof is thus omitted.

In the second embodiment, the optical system 18 includes the flat reflection mirror 36 in addition to the curved reflection mirror 20 and the curved reflection mirror 22. This structure increases the degree of freedom in layout, for example, allows layout conform to the appearance configuration of the spectacle-type image projection device 200. The flat reflection mirror 36 is not necessarily included in the optical system 18, and the flat reflection mirror 36 may be included in at least one of the optical system 18 and the optical system 24. In addition, the number of the flat reflection mirror 36 included in the optical system 18 and/or the optical system 24 is not limited to one, and may be plural such as two or more.

In the first embodiment and the second embodiment, the case where the focal lengths of the curved reflection mirror 20 and the curved reflection mirror 22 are the same has been described, but the focal lengths of the curved reflection mirror 20 and the curved reflection mirror 22 may differ. Similarly, the case where the focal lengths of the curved reflection mirror 26 and the curved reflection mirror 28 are the same has been described, but the focal lengths of the curved reflection mirror 26 and the curved reflection mirror 28 may differ. In this case, to cancel out the influence of the curvature and the difference in optical path length on the laser beam 40, the focal lengths of the curved reflection mirror 20 and the curved reflection mirror 28 are preferably the same, and the focal lengths of the curved reflection mirror 22 and the curved reflection mirror 26 are preferably the same.

In the first embodiment and the second embodiment, the optical system 18 and the optical system 24 may include a lens in addition to the reflection mirror or may include only a lens, but the optical system 18 and the optical system 24 preferably include only the reflection mirror in consideration of the influence of chromatic aberration.

In the first embodiment and the second embodiment, the curved reflection mirrors 20, 22, 26, and 28 may include diffractive elements. In addition, the curved reflection mirrors 20, 22, and 26 are preferably total reflection mirrors that do not transmit light. The curved reflection mirror 28 may be a half mirror that allows light in the direction in which the eye 50 of the user gazes to pass therethrough, or may be a total reflection mirror that does not transmit light. When the curved reflection mirror 28 is a half mirror, a real image in the line of sight is transmitted, and can be visually recognized together with the image by the laser beam 40, and when the curved reflection mirror 28 is a total reflection mirror, only the image by the laser beam 40 can be recognized.

In the first embodiment and the second embodiment, the collimate lens 12 is not limited to a lens, and may be a mirror or a diffractive element as long as the collimate lens 12 has an optical characteristic as a collimator that converts the laser beam 40 to substantially collimated light. Even in this case, the appropriate layout according to the optical path of the laser beam 40 can be selected.

In the first embodiment and the second embodiment, the case where an image is projected on the retina 52 of one of the eyes 50 has been described, but an image may be projected on the retinas 52 of both eyes 50. In addition, the scan mirror 14 has been described as an example of a scan unit, but the scan unit may be any element as long as it can scan a light beam. For example, other components such as lithium tantalate niobate (KTN) crystal that is an electro-optic material may be used as the scan unit. The case where the light beam is a laser beam has been described as an example, but the light beam may be light other than the laser beam.

Although embodiments of the present invention have been specifically described, the present invention is not limited to those particular embodiments, and various changes and modifications may be made to them without departing from the scope of the invention disclosed in the claims.

The invention claimed is:

1. An image projection device comprising:
   a light source that emits a light beam;
   a control unit that generates an image light beam based on input image data, and controls emission of the image light beam from the light source;
   a scan unit that scans the image light beam emitted from the light source to emit a scanning light; and
   a projection unit that irradiates a retina of an eye of a user with the scanning light to project an image on the retina, wherein
   the projection unit includes a first optical system and a second optical system, the first optical system converging the scanning light emitted from the scan unit on a first virtual plane, which is located outside the eye of the user, at an angle substantially equal to a scan angle of the scan unit, the second optical system converging the scanning light that has passed through the first virtual plane on a second virtual plane, which is located inside the eye of the user and near a pupil, at an angle substantially equal to an emission angle from the first virtual plane, and the first optical system includes a first curved reflection mirror of which a reflection surface is concave, and a second curved reflection mirror that is located in a latter stage of the first curved reflection mirror and reflects the scanning light to the first virtual plane, a reflection surface of the second curved reflection mirror being concave, the second optical system includes a third curved reflection mirror of which a reflection surface is concave and a fourth curved reflection mirror that is located in a latter stage of the third curved reflection mirror and reflects the scanning light to the second virtual plane, a reflection surface of the fourth curved reflection mirror being concave, each of the first optical system and the second optical system does not include a curved reflection mirror of which a reflection surface is convex, and all bent angles at which the image light beam corresponding to a center of the image of the scanning light is reflected b the first curved reflection mirror, the second curved reflection mirror, the third curved reflection mirror, and the fourth curved reflection mirror are substantially equal.

2. The image projection device according to claim 1, wherein
in the scanning light, a conjugate relationship of substantially equal magnification between the scan unit and the first virtual plane is achieved through the first optical system, and a conjugate relationship of substantially equal magnification between the first virtual plane and the second virtual plane is achieved through the second optical system.

3. The image projection device according to claim 1, wherein
the first curved reflection mirror the fourth curved reflection mirror are arranged in positions point-symmetric with respect to a point on the first virtual plane, and the second curved reflection mirror and the third curved reflection mirror are arranged in positions point-symmetric with respect to the point on the first virtual plane.

4. The image projection device according to claim 1, wherein
at least one of the first optical system d the second optical system includes a flat reflection mirror.

5. The image projection device according to claim 1, wherein
the first curved reflection mirror and the fourth curved reflection mirror are identical components, and the second curved reflection mirror and the third curved reflection mirror are identical components.

6. The image projection device according to claim 1, wherein
the image light beam when entering the first optical system from the scan unit is substantially collimated light, and the image light beam when entering the second virtual plane from the second optical system is substantially collimated light.

7. An image projection device comprising:
a light source that emits a light beam;
a control unit that generates an image light beam based on input image data, and controls emission of the image light beam from the light source;
a scan unit that scans the image light beam emitted from the light source to emit a scanning light; and
a projection unit that irradiates a retina of an eye of a user with the scanning light to project an image on the retina, wherein
the projection unit includes a first optical system and a second optical system, the first optical system converging the scanning light emitted from the scan unit on a first virtual plane that is located outside the eye of the user, the second optical system converging the scanning light that has passed through the first virtual plane on a second virtual plane that is located inside the eye of the user and near a pupil,
the first optical system includes a first curved reflection mirror and a second curved reflection mirror that is located in a latter stage of the first curved reflection mirror and reflects the scanning light to the first virtual plane,
the second optical system includes a third curved reflection mirror and a fourth curved reflection mirror that is located in a latter stage of the third curved reflection mirror and reflects the scanning light to the second virtual plane,
bent angles at which the scanning light is reflected b the first curved reflection mirror, the second curved reflection mirror, the third curved reflection mirror, and the fourth curved reflection mirror are substantially equal, and
the first curved reflection mirror and the fourth curved reflection mirror are arranged in positions point-symmetric with respect to a point on the first virtual plane, and the second curved reflection mirror and the third curved reflection mirror are arranged in positions point-symmetric with respect to the point on the first virtual plane.

8. The image projection device according to claim 7, wherein
the first curved reflection mirror and the fourth curved reflection mirror identical components, and the second curved reflection mirror and the third curved reflection mirror are identical components.

9. The image projection device according to claim 7, wherein
the first optical system converges the scanning light emitted from the scan unit on the first virtual plane at an angle substantially equal to a scan angle of the scan unit, and
the second optical system converges the scanning light that has passed through the first virtual plane on the second virtual plane at an angle substantially equal to an emission angle from the first virtual plane.

10. The image projection device according to claim 7, wherein
in the scanning light, a conjugate relationship of substantially equal magnification between the scan unit and the first virtual plane is achieved through the first optical system, and a conjugate relationship of substantially equal magnification between the first virtual plane and the second virtual plane is achieved through the second optical system.

11. The image projection device according to claim 7, wherein at least one of the first optical system and the second optical system includes a flat reflection mirror.

12. The image projection device according to claim 7, wherein
the image light beam when entering the first optical system from the scan unit is substantially collimated light, and the image light beam when entering the second virtual plane from the second optical system is substantially collimated light.

* * * * *